United States Patent
Mackenzie

(10) Patent No.: US 11,041,368 B2
(45) Date of Patent: Jun. 22, 2021

(54) METHOD AND APPARATUS FOR PERFORMING OPERATIONS IN FLUID CONDUITS

(71) Applicant: Paradigm Flow Services Limited, Banchory (GB)

(72) Inventor: Hugh Mackenzie, Banchory (GB)

(73) Assignee: PARADIGM FLOW SERVICES LIMITED, Banchory (GB)

(*) Notice: Subject to any disclaimer, the term of this patent is extended or adjusted under 35 U.S.C. 154(b) by 305 days.

(21) Appl. No.: 15/547,232

(22) PCT Filed: Jan. 28, 2016

(86) PCT No.: PCT/GB2016/050184
§ 371 (c)(1),
(2) Date: Jul. 28, 2017

(87) PCT Pub. No.: WO2016/120624
PCT Pub. Date: Aug. 4, 2016

(65) Prior Publication Data
US 2018/0030814 A1  Feb. 1, 2018

(30) Foreign Application Priority Data

Jan. 28, 2015 (GB) ..................................... 1501432

(51) Int. Cl.
*E21B 37/00* (2006.01)
*F16L 9/14* (2006.01)
(Continued)

(52) U.S. Cl.
CPC ............ *E21B 37/00* (2013.01); *B08B 9/0433* (2013.01); *B08B 9/055* (2013.01); *F16L 9/14* (2013.01)

(58) Field of Classification Search
CPC combination set(s) only.
See application file for complete search history.

(56) References Cited

U.S. PATENT DOCUMENTS 5,458,691 A   10/1995 Daniels
5,526,877 A    6/1996 Winz
(Continued)

FOREIGN PATENT DOCUMENTS

EP    1496297 A2    1/2005

OTHER PUBLICATIONS

Lang, Xavier, European Patent Office International Search Authority, International Search Report for PCT/GB2016/050184 filed Jan. 28, 2016, dated Aug. 9, 2016, 8 pages.
(Continued)

*Primary Examiner* — Erin F Bergner
(74) *Attorney, Agent, or Firm* — Perkins Coie LLP

(57) ABSTRACT

A method and apparatus for cleaning a fluid conduit in a hydrocarbon production installation. The method comprises providing a composite pipe having a cleaning head coupled to a first end, and introducing the first end of the composite pipe and the cleaning head into a fluid conduit to be cleaned. Fluid is circulated between an annulus between an interior wall of the fluid conduit and the composite pipe, through a fluid circulation path defined by the cleaning head. The method comprises running the first end of the composite pipe and the cleaning head into the fluid conduit and cleaning at least one substance from the fluid conduit. An aspect of the invention relates to methods comprising circulating a heavy fluid through the fluid circulation path to reduce the effective weight of the pipe in the fluid conduit, and another aspect relates to a method comprising generating at least one pressure pulse in fluid in the fluid circulation path while imparting a pulling force or a pushing force on the pipe.

21 Claims, 4 Drawing Sheets

(51) Int. Cl.
*B08B 9/055* (2006.01)
*B08B 9/043* (2006.01)

(56) References Cited

U.S. PATENT DOCUMENTS

| | | | |
|---|---|---|---|
| 6,044,769 A * | 4/2000 | Oka | F16L 55/179 |
| | | | 104/138.2 |
| 6,076,603 A | 6/2000 | Perrin | |
| 8,281,862 B2 | 10/2012 | Barber et al. | |
| 8,684,089 B2 | 4/2014 | Borhaug et al. | |
| 8,770,892 B2 | 7/2014 | Sweeney et al. | |
| 8,978,767 B2 | 3/2015 | Machin et al. | |
| 9,169,714 B2 | 10/2015 | Edwards et al. | |
| 9,993,854 B2 | 6/2018 | Macaulay et al. | |
| 2003/0056954 A1 * | 3/2003 | Headworth | E21B 17/18 |
| | | | 166/302 |
| 2005/0284504 A1 * | 12/2005 | Kinnari | F16L 55/38 |
| | | | 134/22.11 |
| 2009/0288836 A1 | 11/2009 | Goodall et al. | |
| 2013/0025874 A1 | 1/2013 | Saunders et al. | |
| 2013/0056108 A1 * | 3/2013 | Wood | B32B 1/08 |
| | | | 138/140 |
| 2014/0053874 A1 | 2/2014 | Mackenzie et al. | |

OTHER PUBLICATIONS

Nickitas-Etienne, Athina, International Bureau of WIPO International Preliminary Report on Patentability dated Aug. 1, 2017 for PCT/GB2016/050184 filed Jan. 28, 2016, 13 pages.

\* cited by examiner

METHOD AND APPARATUS FOR PERFORMING OPERATIONS IN FLUID CONDUITS

The present invention relates to a method and/or apparatus for performing operations in fluid conduits, and in particular to a method and apparatus for performing operations in fluid conduits in the hydrocarbon exploration, production and transportation industries. Particular aspects and embodiments of the invention relate to methods and apparatus for performing operations, including cleaning, blockage and/or debris removal operations, in subsea pipelines which are accessed from surface via fluid conduits such as marine, catenary and/or flexible risers.

BACKGROUND TO THE INVENTION

During hydrocarbon production and transportation operations, it is common for the interiors of fluid conduits, including pipelines, wellbores, risers and umbilicals, to become fouled. This fouling can lead to the build up of layers of debris, scale or particulate matter on the inside of conduits, which reduces the effective inner diameter (ID) of the conduit and reduces the flow rate. Fouling may also produce blockages in the fluid conduits which completely prevent fluid flow though the conduit. Particulate matter may accumulate on the inside of the wellbore during the drilling, completion and/or workover of a well. In addition, sand and other particulate matter may be produced from the formation and accumulate inside the production tubing, and may partially or completely block fluid flow through the production tubing, decreasing the production rate and the efficiency of the well.

It is known to use coiled tubing intervention to provide access to pressurised wellbores in wellbore cleanout operations. Coiled tubing is a long continuous length of metal piping wound on a spool, which is straightened by plastic deformation and inserted into the wellbore. In a cleaning application, fluid is circulated through the inside of the coiled tubing and back out through the annulus between the coiled tubing and the wellbore. Particulate matter in the wellbore is brought to surface by the circulating fluid. When performing this type of wellbore operation, it is necessary to employ procedures and equipment for controlling and retaining pressure in the wellbore system to ensure it is isolated from surface. A typical pressure control system includes an injector head that contains a drive mechanism to push and pull the coiled tubing in and out of the hole through a pressure control device.

The coiled tubing injector system described above is a substantial and heavy piece of equipment, with large footprint and high capital expense. The coiled tubing injector system also requires a distance of several metres to be available above the isolation valve to accommodate the injector and the gooseneck. This limits the number of installations where coiled tubing operations can be performed and can make operations more costly. These problems are particularly significant in the case of offshore operations, for example in a turret of a floating production storage production and offloading vessel (FPSO) where space is at a premium and cranes are unable to lift the components into place. Even light coiled tubing units which are used onshore are still substantial pieces of equipment which are large in size and weight in the context of offshore operations.

To alleviate the problems associated with coiled tubing injection such as helical lock-up, coiled tubing thruster systems have been developed. Examples are described in US 2005/247448 and US 2011/277255. The systems use thruster pigs on the end of the coiled tubing to create an additional force on the coiled tubing which enables it to be deployed to greater depth. Fluid is pumped down the annulus between the wellbore wall and the coiled tubing, and applies pressure against the thruster pig, before the fluid passes out of in front of the bottomhole assembly. The fluid then returns to surface through the bore of the coiled tubing.

WO2006/001707 and US2005/0284504 also describe thruster pig systems that include return flow lines and which are used in hydrate removal applications.

Other considerations limit the applications of coiled tubing. Firstly, blockages and restrictions can occur in narrow bore fluid conduits, which are simply too small to receive coiled tubing. In addition, the coiled tubing injector systems described above rely on the rigidity of the coiled tubing to allow it to be pushed into a hole, rather than relying on gravity only (as is the case in wireline operations). However, this rigidity also has drawbacks that make coiled tubing interventions unsuitable for some applications. For example, it may not be possible to inject coiled tubing into a fluid conduit which has a deviated or convoluted path. In extreme cases, the rigid coiled tubing may not be able to pass through some curved or bent pipeline systems. Even where passage is possible, the frictional resistance between the coiled tubing and the inside wall of the wellbore will limit the depth to which the coiled tubing can be deployed. For the foregoing reasons, the wellbore cleanout systems according to the prior art are generally unsuitable for applications other than the cleaning of wellbores.

WO2012/140432 and WO2014/102549 describe methods of cleaning a fluid conduit in a hydrocarbon production installation by introducing a flexible hose into a fluid conduit system through a pressure control device and running the flexible hose into a conduit to be cleaned while a fluid stream flows in the conduit. The flexible hose is capable of being flexed or bent without plastic deformation of the hose material and/or without imparting significant levels of fatigue. This enables the apparatus to be deployed through deviated or highly convoluted paths, and therefore facilitates application to a wide range of cleaning operations.

SUMMARY OF THE INVENTION

It is amongst the aims and objects of the invention to provide a method and/or apparatus for performing operations in fluid conduits which is an alternative to the method and apparatus described above.

It is amongst the aims and objects of the invention to provide a method and/or apparatus for performing operations in fluid conduits which obviates or mitigates one or more drawbacks or disadvantages of the prior art, including the coiled tubing wellbore clean out systems and/or flexible hose cleaning systems described above.

In particular, one aim of an aspect of the invention is to provide a method and/or apparatus which facilitates application to a wider range of fluid conduit systems than the coiled tubing wellbore clean out systems and/or flexible hose cleaning systems described above.

An aim of an aspect of the invention is to provide a method and/or apparatus which facilitates application to operations, including cleaning, blockage, and/or debris removal operations, in subsea pipelines which are accessed from surface via fluid conduits such as marine, catenary and/or flexible risers.

An aim of an aspect or embodiment of the invention is to provide a method and/or apparatus which reduces the force required to pull out and/or inject a cleaning apparatus from and/or into a fluid conduit.

An aim of an aspect or embodiment of the invention is to provide a method and/or apparatus which increases the depth to which a cleaning apparatus can be deployed into a fluid conduit.

A further aim of an aspect or embodiment of the invention is to provide a method and/or apparatus which facilitates passage of a cleaning apparatus around convoluted paths defined by fluid conduits; which enables passage of a greater number of corners or bends in fluid conduits; and/or which enables depths or distances of deployment to be maintained in system which include convoluted paths.

A further aim of an aspect or embodiment of the invention is to provide a method and/or apparatus which reduces the damage to a fluid conduit during a deployment and/or pulling of a cleaning apparatus into and/or from a fluid conduit.

Additional aims and objects of the invention will become apparent from reading the following description.

According to a first aspect of the invention, there is provided a method of cleaning a fluid conduit in a hydrocarbon production installation, the method comprising: providing a composite pipe having a cleaning head coupled to a first end; introducing the first end of the composite pipe and the cleaning head into a fluid conduit to be cleaned;

circulating fluid between an annulus between an interior wall of the fluid conduit and the composite pipe, through a fluid circulation path defined by the cleaning head;

running the first end of the composite pipe and the cleaning head into the fluid conduit; and cleaning at least one substance from the fluid conduit.

The use of composite pipe in the first aspect of the invention offers advantages over steel coiled tubing wellbore cleaning systems and flexible hose cleaning systems of the prior art. The use of composite pipe facilitates application to a wide range of fluid conduit systems. The use of composite pipe reduces the force required to pull out and/or inject a cleaning apparatus from and/or into a fluid conduit; increases the depth to which a cleaning apparatus can be deployed into a fluid conduit; and reduces the damage to a fluid conduit during a deployment and/or pulling of a cleaning apparatus into and/or from a fluid conduit.

The composite pipe may be a glass fibre reinforced plastic pipe.

The composite pipe may be a carbon fibre pipe, and may be a carbon fibre polymer pipe. The composite pipe may be manufactured from carbon fibre material and a thermoplastic polymer, which may be a semi-crystalline polymer. In one embodiment, the composite pipe comprises carbon fibre and polyether ether ketone (PEEK), or another polymer in the polyaryletherketone (PAEK) family.

In some embodiments, the composite pipe comprises an inner diameter in the range of 25 mm to 75 mm. In preferred embodiments, the composite pipe comprises an inner diameter in the range of 25 mm to 60 mm.

Preferably, the composite pipe has a weight per unit length in water that is less than 4 kg/m. In some embodiments, the composite pipe has a weight per unit length in water that is less than 3 kg/m. In some embodiments, the composite pipe has a weight per unit length in water in the range of 0.25 kg/m to 2.5 kg/m.

In one particular embodiment, the composite pipe has a weight per unit length in water that in the range of 0.5 kg/m to 1.0 kg/m.

Preferably, the composite pipe has a tensile strength of greater than 1,000 kg. The composite pipe may have a tensile strength of greater than 2,000 kg, and may have a tensile strength in excess of 2,500 kg. In an embodiment of the invention, the composite pipe has a tensile strength in excess of 30,000 kilograms.

The composite pipe may have a collapse pressure rating in excess of 350 psi. In some embodiments, the composite pipe may have a collapse pressure rating in excess of 1,000 psi, and in some embodiments of the invention, the composite pipe may have a collapse pressure rating in excess of 3,500 psi.

Preferably the composite pipe is spoolable.

The minimum elastic bending radius is a convenient way of measuring the flexibility of a pipe. Preferably the composite pipe has a minimum elastic bending radius of less than 100 times the inner diameter of the pipe.

More preferably, the composite pipe has even greater flexibility, and has a minimum elastic bending radius of less than 50 times the inner diameter of the pipe. In certain embodiments, the composite pipe has a minimum elastic bend radius of between 20 times the inner diameter of the tubing and 50 times the inner diameter of the tubing.

The flexibility of the composite pipe is a clear distinction from coiled tubing applications. Typically steel coiled tubing has a minimum elastic bending radius of around 200 times the inner diameter of the tubing.

The composite pipe preferably comprises a primary wall which is of unitary construction and provides axial tensile and radial compressive support to the composite pipe. The primary wall of the composite pipe may be an outer wall of the composite pipe, and as such may be capable of being engaged by an injection module for imparting a pulling and/or pushing force on the composite pipe. Thus the primary wall is capable of directing tensile forces along the pipe. The outer wall may determine the maximum tensile strength of the composite pipe.

The primary wall may be formed from a glass fibre reinforced plastic material. Alternatively, the primary wall may be formed from a carbon fibre polymer material, which may be manufactured from carbon fibre material and a thermoplastic polymer. In one embodiment, the primary wall comprises carbon fibre and polyether ether ketone (PEEK), or another polymer in the polyaryletherketone (PAEK) family.

Using a composite pipe of this type is an advantage over the use of a flexible hose in certain applications, as it enables significant tensile forces to be applied to the pipe during running, pulling, and during the cleaning operation. The inventors have discovered that the flexible hoses of the type described in WO2012/140432 and WO2014/102549, while suitable for many applications, may suffer from longitudinal stretching and delamination under in some operations, particularly when used with cleaning heads which include thrusters and/or when deployed to long distances. Typically, during a cleaning or blockage removal application, a backwards pulling force is required to act against the thrusting force in order to maintain the position of the cleaning head throughout the cleaning operation. The tensile force through the hose tends to cause elongation of the hose, which reduces control over the position of the cleaning head and reduces the life of the hose. In addition, the tensile forces are transferred from the injector module to the hose via an outer liner, rather than a tension-bearing structure. This tends to cause delamination of the hose structure. The high pulling forces required to retrieve the hose also tend to cause delamination and/or hose stretching.

In contrast, the composite pipes of the present aspect of the invention comprise a unitary primary wall which transfers the tensile forces experienced through a range of operations.

The method may comprise generating a thrust force on the cleaning head by circulating fluid through the circulation path.

The method may comprise circulating a heavy fluid through the fluid circulation path to reduce the effective weight of the pipe in the fluid conduit.

The method may comprise generating at least one pressure pulse in fluid in the fluid circulation path while imparting a pulling force or a pushing force on the pipe.

According to a second aspect of the invention, there is provided a method of cleaning a fluid conduit in a hydrocarbon production installation, the method comprising:

providing a pipe having a cleaning head coupled to a first end;

introducing the first end of the pipe and the cleaning head into a fluid conduit to be cleaned;

providing a fluid circulation path between an annulus defined by an interior wall of the fluid conduit and a bore of the pipe via the cleaning head;

running the first end of the pipe and the cleaning head into the fluid conduit; and cleaning at least one substance from the fluid conduit by circulating a cleaning fluid through the fluid circulation path;

wherein the method comprises circulating a heavy fluid through the fluid circulation path to reduce the effective weight of the pipe in the fluid conduit.

Embodiments of the second aspect of the invention may include one or more features of the first aspect of the invention or its embodiments, or vice versa.

According to a third aspect of the invention, there is provided a method of cleaning a fluid conduit in a hydrocarbon production installation, the method comprising:

providing a pipe having a cleaning head coupled to a first end;

introducing the first end of the pipe and the cleaning head into a fluid conduit to be cleaned;

providing a fluid circulation path between an annulus defined by an interior wall of the fluid conduit and a bore of the pipe via the cleaning head;

running the first end of the pipe and the cleaning head into the fluid conduit; and cleaning at least one substance from the fluid conduit by circulating a cleaning fluid through the fluid circulation path;

wherein the method comprises circulating a heavy fluid through the fluid circulation path, wherein the heavy fluid has a density greater than the density of freshwater.

Embodiments of the third aspect of the invention may include one or more features of the first or second aspects of the invention or their embodiments, or vice versa.

According to a fourth aspect of the invention, there is provided a method of cleaning a fluid conduit in a hydrocarbon production installation, the method comprising:

providing a pipe having a cleaning head coupled to a first end;

introducing the first end of the pipe and the cleaning head into a fluid conduit to be cleaned;

providing a fluid circulation path between an annulus defined by an interior wall of the fluid conduit and a bore of the pipe via the cleaning head;

running the first end of the pipe and the cleaning head into the fluid conduit; and cleaning at least one substance from the fluid conduit by circulating a cleaning fluid through the fluid circulation path;

wherein the method comprises circulating a heavy fluid through the fluid circulation path, wherein the heavy fluid has a density greater than about 1.02 kg/l (about 8.51 ppg).

By circulating a heavy fluid, for example a heavy fluid having a density greater than that of freshwater, the effective weight of the pipe in the fluid conduit is reduced. This facilitates application to a wider range of fluid conduit systems than the coiled tubing wellbore clean out systems described above. The reduction in effective weight reduces the forces required to pull out and/or inject a cleaning apparatus from and/or into a fluid conduit; increases the depth to which a cleaning apparatus can be deployed into a fluid conduit; and reduces the damage to a fluid conduit during a deployment and/or pulling of a cleaning apparatus into and/or from a fluid conduit. In particular, the reduction in friction can mitigate the damage to the inside radius of a bend or corner in the fluid conduit caused by withdrawing the pipe from the fluid conduit. In severe cases, with steel coiled tubing, the force of the pipe on the inside radius of the fluid conduit has been found to cause catastrophic damage to the fluid conduit.

Preferably, the heavy fluid is an aqueous fluid. Most preferably, the heavy fluid is a brine. The heavy fluid may be a brine selected to reduce the effective weight of the pipe in the fluid conduit to below a weight threshold. The weight threshold may, for example, be related to a maximum pulling and/or pushing force available to pull and/or push the pipe into the fluid conduit.

Preferably the heavy fluid has a density sufficient to render the effective weight of the pipe in the fluid conduit to be less than approximately 2 kg/m. In some embodiments, the circulated fluid has a density sufficient to render the effective weight of the pipe in the fluid conduit to be less than approximately 1 kg/m.

The heavy fluid may have a density greater than 1.2 kg/l (10.0 ppg).

The heavy fluid may be selected from a brine selected from the group comprising potassium chloride (KCl), sodium chloride (NaCl), potassium bromide (KBr), calcium chloride ($CaCl_2$), sodium bromide (NaBr), calcium bromide ($CaBr_2$), zinc bromide ($ZnBr_2$).

The heavy fluid may have a density in the range of approximately 1.37 kg/l to 1.39 kg/l (about 11.4 ppg to 11.6 ppg). The heavy fluid may comprise a calcium chloride ($CaCl_2$) brine. A brine of calcium chloride may be preferred as it is readily available, and is known to have properties acceptable for use in hydrocarbon applications.

In alternative embodiments of the invention, aqueous brines of alternative salts may be preferred due to the high density of brines saturated with those salts. For example, a calcium bromide ($CaBr_2$) brine may be used in alternative embodiments of the invention. The brine may, for example, have a density in the range of approximately 1.80 kg/l to 1.92 kg/l (about 15 ppg to 16 ppg).

In embodiments of the invention, the heavy fluid comprises a mixture of brines selected to achieve the desired fluid density.

The heavy fluid may be selected to render the pipe neutrally buoyant, or may be selected to render the pipe positively buoyant. Alternatively, the heavy fluid may be selected to bring a negatively buoyant pipe towards a neutrally buoyant or positively buoyant condition (without necessarily reaching neutral or positive buoyancy).

The use of a heavy fluid may reduce the effective weight of a pipe such that the friction between the pipe and an inner surface of the fluid conduit is reduced. Preferably, the pipe is a composite pipe. The use of a composite pipe is advantageous as it has a weight per unit length significantly lower than coil tubing of an equivalent diameter. This facilitates the use of heavy fluids (such as readily available brines) to render the pipe fully buoyant in the fluid conduit.

The method may comprise exposing the pipe to the heavy fluid while imparting a pulling force or pushing force on the pipe. The fluid conduit and/or pipe may be filled with the heavy fluid while imparting a pulling force or pushing force on the pipe.

The method may comprise circulating the heavy fluid in the fluid circulation path to fill the fluid conduit and/or pipe prior to imparting a pulling and/or a pushing force on the pipe. Alternatively or in addition, the method may comprise circulating the heavy fluid in the fluid circulation path while imparting a pulling and/or a pushing force on the pipe.

The method may comprise circulating a cleaning fluid during a cleaning phase of the operation. The cleaning fluid may be a first fluid, different from the heavy fluid. The method may comprise circulating the heavy fluid, which is different from the cleaning fluid, prior to and/or subsequent to the cleaning phase. Therefore the heavy fluid may be circulated in a separate running or retrieval phase, during which the pipe is run into the fluid conduit or pulled from the fluid conduit.

Alternatively, the heavy fluid may be circulated through the fluid circulation path during a cleaning phase. Therefore the heavy fluid may function as the cleaning fluid during removal and/or cleaning of a blockage and/or debris from the fluid conduit.

Preferably the pipe is a composite pipe.

Embodiments of the fourth aspect of the invention may include one or more features of the first to third aspects of the invention or their embodiments, or vice versa.

According to a fifth aspect of the invention, there is a method of cleaning a fluid conduit in a hydrocarbon production installation, the method comprising:

providing a pipe having a cleaning head coupled to a first end;

introducing the first end of the pipe and the cleaning head into a fluid conduit to be cleaned;

providing a fluid circulation path between an annulus defined by an interior wall of the fluid conduit and a bore of the pipe via the cleaning head;

running the first end of the pipe and the cleaning head into the fluid conduit; and cleaning at least one substance from the fluid conduit by circulating a cleaning fluid through the fluid circulation path;

wherein the method comprises generating at least one pressure pulse in fluid in the fluid circulation path while imparting a pulling force or a pushing force on the pipe.

By generating at least one pressure pulse in fluid in the fluid circulation path, the method may create a fluid-surface interaction which temporarily reduces the friction between the pipe and the conduit. The method may comprise generating at least one pressure pulse having a magnitude greater than 50 psi. In some embodiments of the invention, the invention may comprise generating a pressure pulse greater than 100 psi. In some embodiments of the invention, the method may comprise generating at least one pressure pulse having a magnitude greater than 200 psi.

The method may comprise generating a plurality of pressure pulses, and may comprise generating at least one series of pressure pulses. A series of pressure pulses may have a frequency of less than 3 Hz, and in some embodiments may have a frequency of less than 2 Hz.

The duration of a pulse may be less than one second, and in some embodiments, may be approximately 0.5 seconds.

In an embodiment of the invention, the duration of the pressure pulse may be of the order of 0.25 seconds.

The method may comprise causing a positive pressure pulse to propagate in the fluid circulation path.

The method may comprise exposing the annulus to a positive pressure differential to generate the at least one pressure pulse.

Alternatively, or in addition, the method may comprise exposing a bore of the pipe to a positive pressure differential to generate the at least one pressure pulse.

The method may comprise causing a negative pressure pulse to propagate in the fluid circulation path.

The method may comprise exposing the annulus to a negative pressure differential.

Alternatively, or in addition, the method may comprise exposing a bore of the pipe to a negative pressure differential.

Preferably the pipe is a composite pipe.

Embodiments of the fifth aspect of the invention may include one or more features of the first to fourth aspects of the invention or their embodiments, or vice versa.

According to a sixth aspect of the invention, there is a method of cleaning a fluid conduit in a hydrocarbon production installation, the method comprising:

providing a composite pipe having a cleaning head coupled to a first end;

introducing the first end of the pipe and the cleaning head into a fluid conduit to be cleaned;

providing a fluid circulation path between an annulus defined by an interior wall of the fluid conduit and a bore of the composite pipe via the cleaning head;

running the first end of the pipe and the cleaning head into the fluid conduit; and cleaning at least one substance from the fluid conduit by circulating a cleaning fluid through the fluid circulation path;

wherein the method comprises circulating a heavy fluid through the fluid circulation path to reduce the effective weight of the pipe in the fluid conduit.

Embodiments of the sixth aspect of the invention may include one or more features of the first to fifth aspects of the invention or their embodiments, or vice versa.

According to a seventh aspect of the invention, there is provided an apparatus for cleaning a fluid conduit in a hydrocarbon production installation, the apparatus comprising:

a composite pipe having a cleaning head coupled to a first end;

a pressure control device;

and an injector device for imparting a pushing and/or pulling force on the pipe;

wherein in use, the apparatus defines a fluid circulation path between an annulus defined by an interior wall of the fluid conduit and a bore of the composite pipe via the cleaning head.

Preferably, the apparatus comprises a pump. The pump may be configured to circulate a cleaning fluid and/or a heavy fluid in the fluid circulation path.

The pump may be configured to generate a pressure pulse in the fluid conduit and/or the pipe. The apparatus may comprise a controllable valve for generating a pressure pulse in the fluid conduit and/or the pipe.

Preferably, the injector device comprises a drive mechanism. In a preferred embodiment the drive mechanism comprises at least one chain, and may comprise one or more chain-driven blocks. The one or more chain blocks may comprise one or more teeth or ridges configured to engage with the composite pipe.

The drive mechanism may comprise a contact surface for contacting an outer surface of the composite pipe.

Preferably, the injector device is capable of applying a pushing force or a pulling force equivalent to a weight greater than 1,000 kg. More preferably, the injector device is capable of applying a pushing force or a pulling force equivalent to a weight greater than 2,000 kg. In some embodiment, the injector device is capable of applying a pushing force or a pulling force equivalent to a weight greater than 5,000 kg Preferably, the apparatus comprises a chamber located between the pressure control device and an opening for coupling to a fluid conduit system. The chamber preferably provides access to the composite pipe beneath the pressure control device.

Preferably, the apparatus further comprises a valve, which may be a blowout preventer. The apparatus preferably comprises a cutting device configured to cut, shear, or sever the composite pipe. The cutting device may be incorporated as part of a valve, which may be a shear and seal blowout preventer.

The apparatus may comprise a gripping mechanism, which may be arranged to retain a portion of the composite pipe in the apparatus.

The pressure control device may comprise one or more elastomeric seals or pack-off elements, which may be stripping elements. The pressure control device may be hydraulically actuated. Alternatively or in addition, the pressure control device may be mechanically actuated. Preferably the pressure control device comprises at least two elastomeric seals, arranged so that a second elastomeric seal functions as a back-up to a first elastomeric seal.

The cleaning head may comprise a flow direction arrangement which defines a convoluted fluid path for fluid passing through the cleaning head. The cleaning head may be configured to generate a thrust force on the pipe to deploy it into the fluid conduit.

Embodiments of the seventh aspect of the invention may include one or more features of the first to sixth aspects of the invention or their embodiments, or vice versa.

According to a further aspect of the invention, there is provided an apparatus for cleaning a fluid conduit in a hydrocarbon production installation, substantially as described herein with reference to FIGS. 1, 2, 3, and 5 of the drawings.

According to a further aspect of the invention, there is provided a method for cleaning a fluid conduit in a hydrocarbon production installation, substantially as described herein with reference to FIGS. 1, 2, 3, and 5 of the drawings.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

The invention has application to the cleaning operations for subsea pipelines, including blockage and/or debris removal, and is particularly advantageous in cleaning operations in which the pipeline is accessed from surface via a marine, catenary and/or flexible riser. Accordingly, the invention will be described in the context of such an operation by way of example only.

Figure 1:
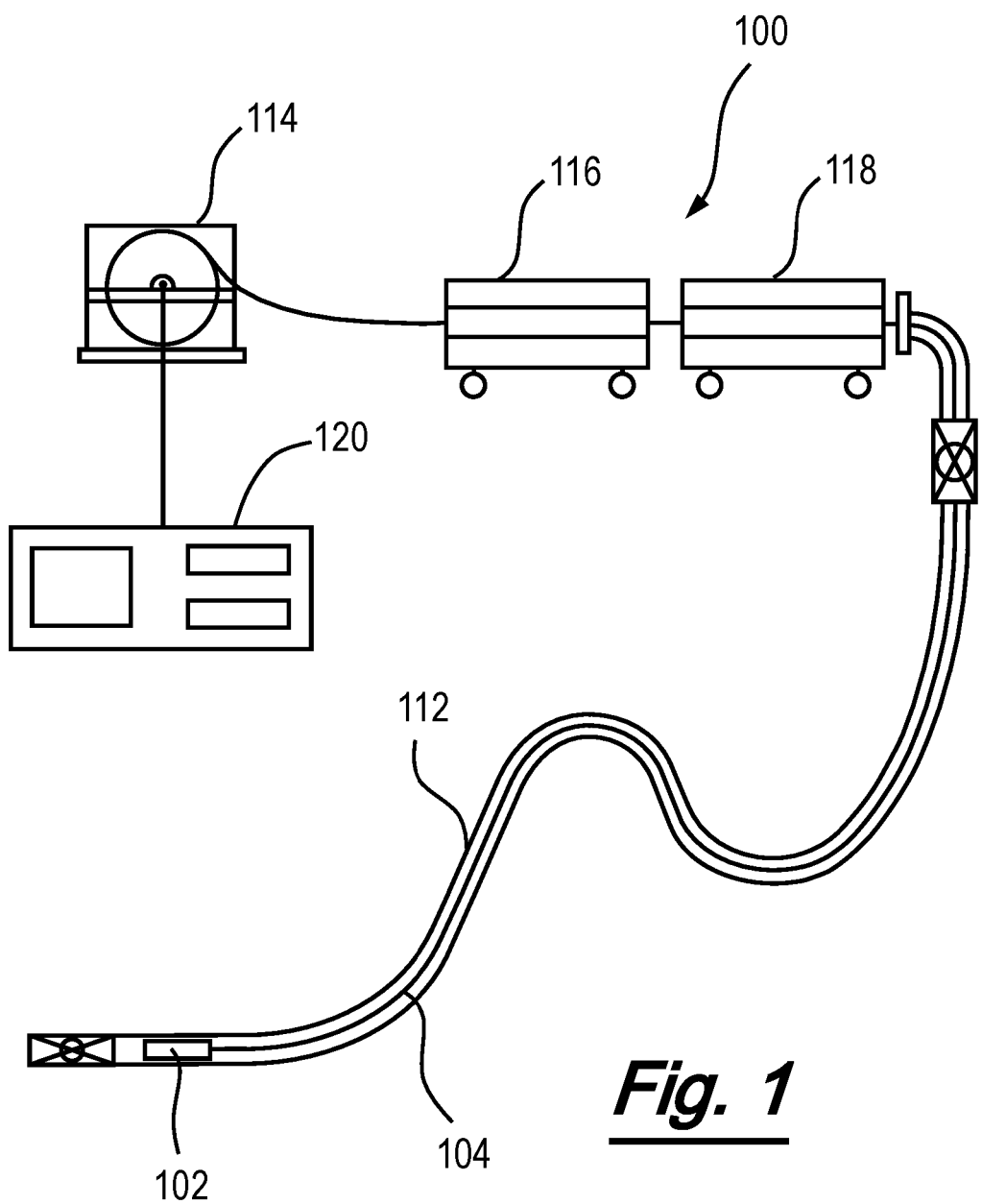
FIG. 1 is a schematic representation of an apparatus according to an embodiment of the invention.

Referring firstly to FIG. 1, there is shown an apparatus according to an embodiment of the invention, generally depicted at 100. The apparatus 100 (shown in more detail in FIG. 2) is formed from a cleaning head 102 and a pipe 104, which in this case is composite pipe formed from a carbon polymer material. The apparatus 100 is shown here in situ in a fluid conduit 112, which in this case is a flexible riser. The apparatus 100 is deployed from a storage reel 114 via an injector unit 116 and a pressure control device 118 comprising a stripper and blow out preventer (BOP) unit.

The injector unit 116 comprises a drive mechanism for pushing and/or pulling the pipe into and out of the fluid conduit through the pressure control apparatus 118. The drive mechanism comprises an arrangement of blocks shaped and sized to engage with the outer surface of the composite pipe.

The stripper comprises internal pack off elements formed from an elastomeric material, arranged to provide a fluid seal with the outer surface of a composite pipe passing through the unit. The stripper allows the composite pipe to pass through the apparatus while retaining pressure in the conduit system beneath the stripper.

The blowout preventer comprises a shear and seal blowout preventer, which has the capability to cut or otherwise sever composite pipe introduced to the fluid conduit. This embodiment also comprises a chamber which functions as a lubricator, providing an access point for the coupling of the cleaning head 102 to the composite pipe. A divertor (not shown) is also provided to create a fluid inlet for fluid pumped into the annulus between the introduced composite pipe and the inner surface of the fluid conduit 112.

A control module 120 communicates with the other elements if the system to control its operation and receive data collected from the apparatus 100. The control module comprises a pump and an arrangement of valves, including a controllable valve which enables the bore of the pipe to be exposed to a pressure differential to generate one or more pressure pulses in the pipe bore.

Figure 2:
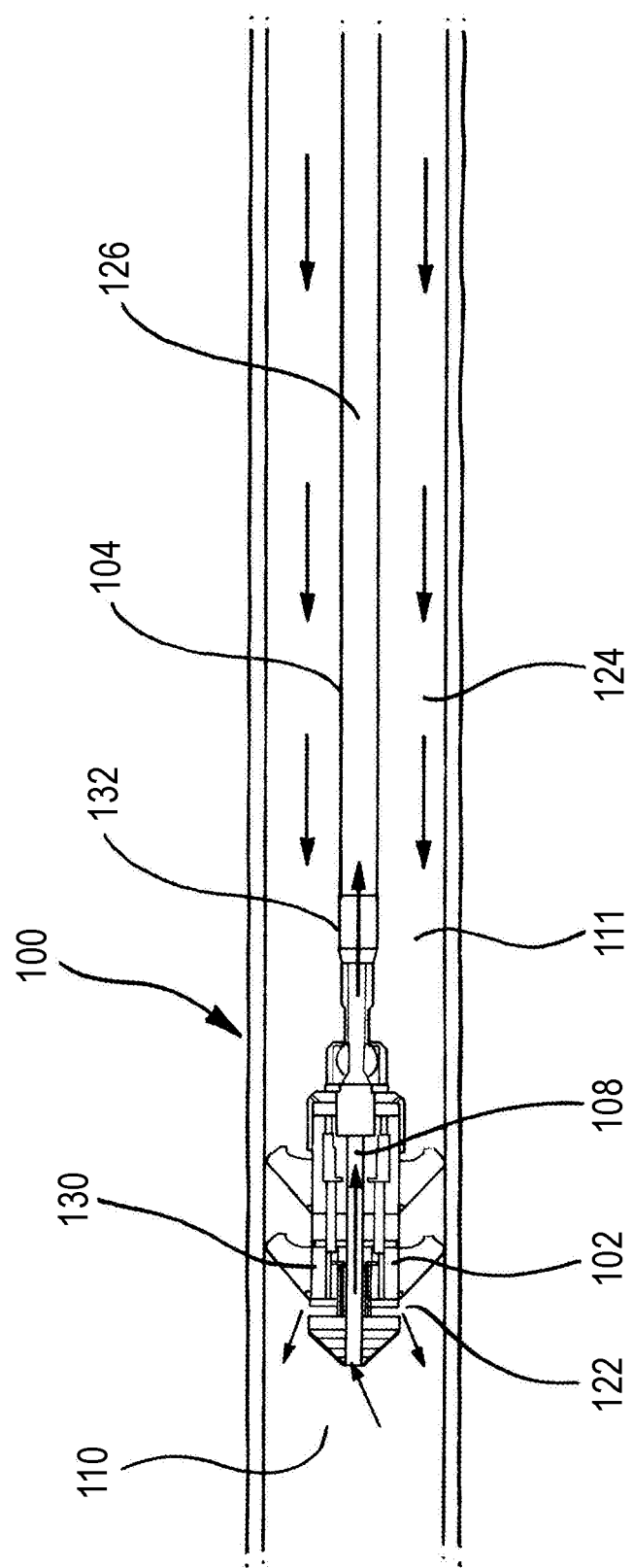
FIG. 2 is sectional view of a part of the apparatus of the embodiment of FIG. 1.

FIG. 2 shows the apparatus 100 in more detail. The cleaning head 102 comprises a body 106 coupled to the composite pipe 104 by a connector 132. The body defines a throughbore 108 from a leading end 110 of the cleaning head to a trailing end 111 joined to the composite pipe 104. The throughbore 108 is continuous with the flow bore 126 of the composite pipe 104 and therefore there is a flow path through the cleaning head to the composite pipe and to surface.

The cleaning head 102 comprises a flow direction arrangement 130, supported by the body 106, which provides a fluid circulation path between the annulus 124 located between an interior wall of the fluid conduit and the body and the throughbore. In this embodiment, the flow direction arrangement defines a convoluted fluid path for fluid passing down through the annulus to the cleaning head, and out through an outlet 122 at the leading end 110. As the fluid passes through the flow direction arrangement 130, a thrust force is generated on the cleaning head to deploy it into the fluid conduit 112. The magnitude of the thrust force is controlled by the pressure of fluid pumped down in the annulus from surface. The design of the flow direction arrangement 130 is in this embodiment in accordance with the principles described in WO2014/102549 (the contents of which are incorporated into this specification by reference), with suitable modifications to connect the cleaning head to a composite pipe 104. In addition, in embodiments of the present invention the cleaning head need not create a seal with the interior of the conduit in order to generate sufficient thrust to deploy the apparatus (which is lighter than the coiled tubing systems in which such thrusters are often used).

The composite pipe of this embodiment is a carbon fibre polymer pipe, formed from continuous carbon fibres and polyether ether ketone (PEEK), with an inner diameter of 47 mm. The pipe comprises an outer wall which is of unitary construction and forms the primary structure which supports the pipe against longitudinal tensile and radial compressive forces. The composite pipe is spoolable, and has a minimum bend radius of approximately 20 to 50 times the inner diameter of the pipe. The composite pipe has a weight per unit length in water of 0.65 kg/m and a tensile strength of around 41,000 kg. The composite pipe has a collapse pressure rating of around 5,000 psi, and a working pressure of around 5,000 psi.

In use in a blockage removal application, the apparatus is conveyed to the desired location from surface by circulation of a deployment fluid (not shown) which generates a thrust on the cleaning head. When the cleaning head is in the desired location and at the desired distance from the blockage a treatment fluid is pumped from surface down the annulus cleaning head, where it passes through the cleaning head to the surface of the blockage.

The use of composite pipe in this embodiment invention offers advantages over steel coiled tubing wellbore cleaning systems and flexible hose cleaning systems of the prior art, as will be described below in the following exemplary applications of the apparatus and systems.

Figure 3:
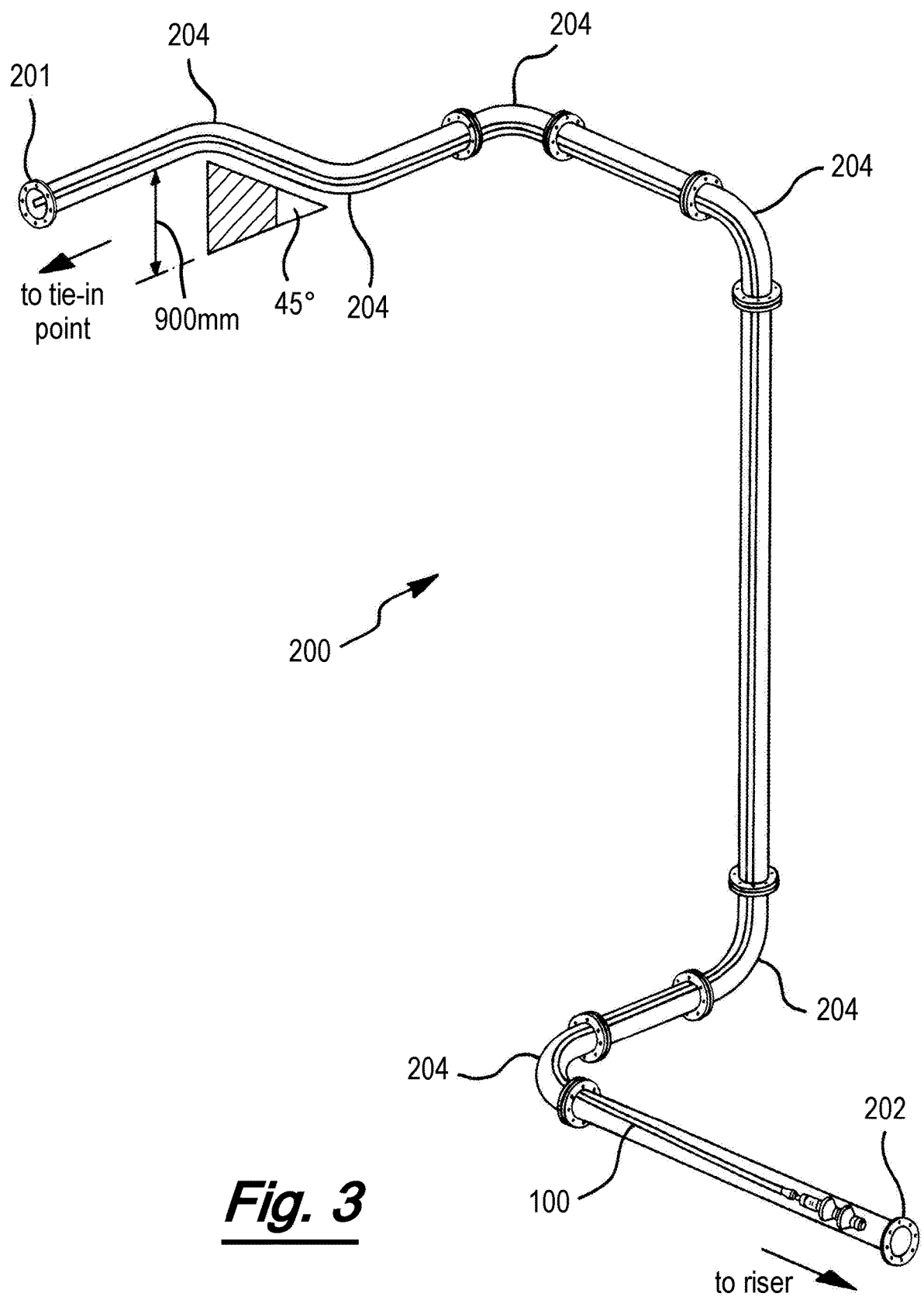
FIG. 3 is a representation of a pipework section between a tie-in point and a riser, which is useful for understanding the benefits of the invention.

FIG. 3 is a representation of pipework at the surface of hydrocarbon production system disposed between a tie-in point and an opening to a riser which leads to a subsea pipeline (not shown). The pipework, general shown at 200, comprises a number (in this case six) of bends 204 between the upper end 201 and the lower end 202 of the pipework. A flowline, which in this case is the apparatus 100, is shown in situ in the pipework, and illustrates the path that the apparatus 100 needs to follow from its tie in point on its way to the cleaning location subsea. Similar, FIG. 3 shows the path through which the apparatus 100 must be withdrawn when the apparatus is pulled from the conduit at the end of the operation.

FIG. 3 illustrates a problem of the effect of friction on the pulling and/or pushing force required to move the apparatus 100 along the pipework, when the pipe is in tension. The force obeys the Capstan Equation:

$$T_{load} = T_{load} e^{\mu \varphi},$$

where $T_{load}$ is the applied tension on the line, $T_{hold}$ is the resulting force exerted at the other end of the line, $\mu$ is the coefficient of friction between the pipe and inner wall of the fluid conduit, and $\varphi$ is the total angle swept by all turns of the pipe, measured in radians (i.e., with one full turn the angle $\varphi = 2\pi$).

Thus the tension at one of the pipe gains exponentially with respect to the angle swept by the pipe, and it is apparent that minimising the friction on the pipe is beneficial to enable the pipe to be moved in the pipework during deployment or retrieval.

Figure 4:
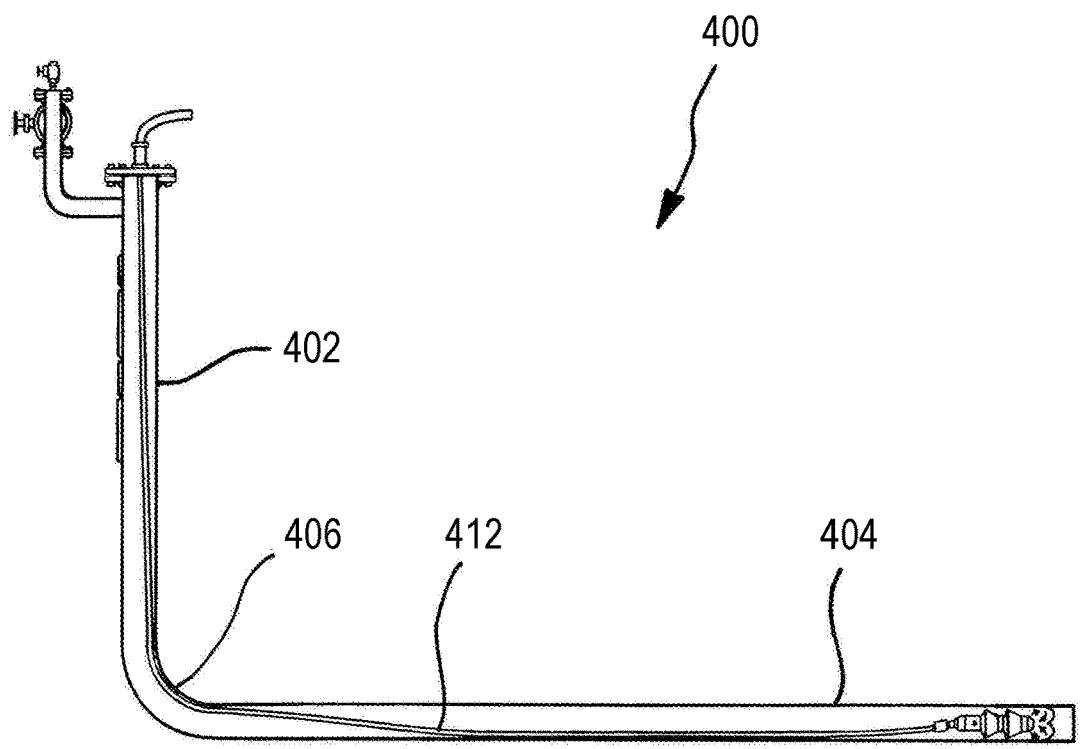
FIG. 4 is a schematic representation of a pipeline system and apparatus according to the prior art.

During deployment of the apparatus, tension in the pipe can be reduced or eliminated by providing a pushing force at the injector unit, while circulating fluid to generate thrust at the cleaning head in a conventional manner. However, when retrieving the apparatus, there is an inherent friction between the pipe and the fluid conduit which creates tension in the pipe, and cannot be overcome by reversing the direction of fluid circulation. This is illustrated with the benefit of FIG. 4, which schematically shows a pipeline system 400, with a conventional apparatus 410 having been deployed from surface down a riser 402 to a subsea pipeline 404. A horizontal section of coned tubing 412 rests on the bottom of the subsea pipeline 404, and the friction between the tubing 412 and the pipeline 404 must be overcome to retrieve the apparatus (in addition to the hanging weight of the vertical pipeline section in the riser). The pulling force required to overcome the horizontal friction and hanging weight is subject to capstan friction gains as the pipe is drawn through additional bends in the pipework between the tie-in point and the riser.

An additional capstan friction effect is created at the inner radius of the bend 406, as the tubing 412 transitions between the horizontal and vertical sections, due to the tension in the pipe causing movement of the pipe in the conduit to the wall on the inside of the bend. As well as increasing the overall friction required to be overcome by the pulling force and exacerbating the capstan effect, when conventional coned tubing is used 412, there is a significant risk of damage to the wall of the fluid conduit on the inside of the bend. This damage could result in catastrophic failure of the riser.

The present invention enables this effect to be mitigated. Firstly, the use of composite pipes, such as the pipe of the present embodiment, reduces the friction between the pipe and the fluid conduit as the materials have a lower coefficient of friction than the steel coned tubing and the inner wall of the fluid conduit.

Secondly, the mass per unit length of composite pipe is significantly less than the mass per unit length of the steel coiled tubing conventionally used. This naturally reduces the pulling force required, and lowers the initial tension which is subject to capstan gains.

Furthermore, the lower mass per unit length enables the use of heavy fluids, such as brines, to further reduce the friction in accordance with embodiments of the invention.

Figure 5:
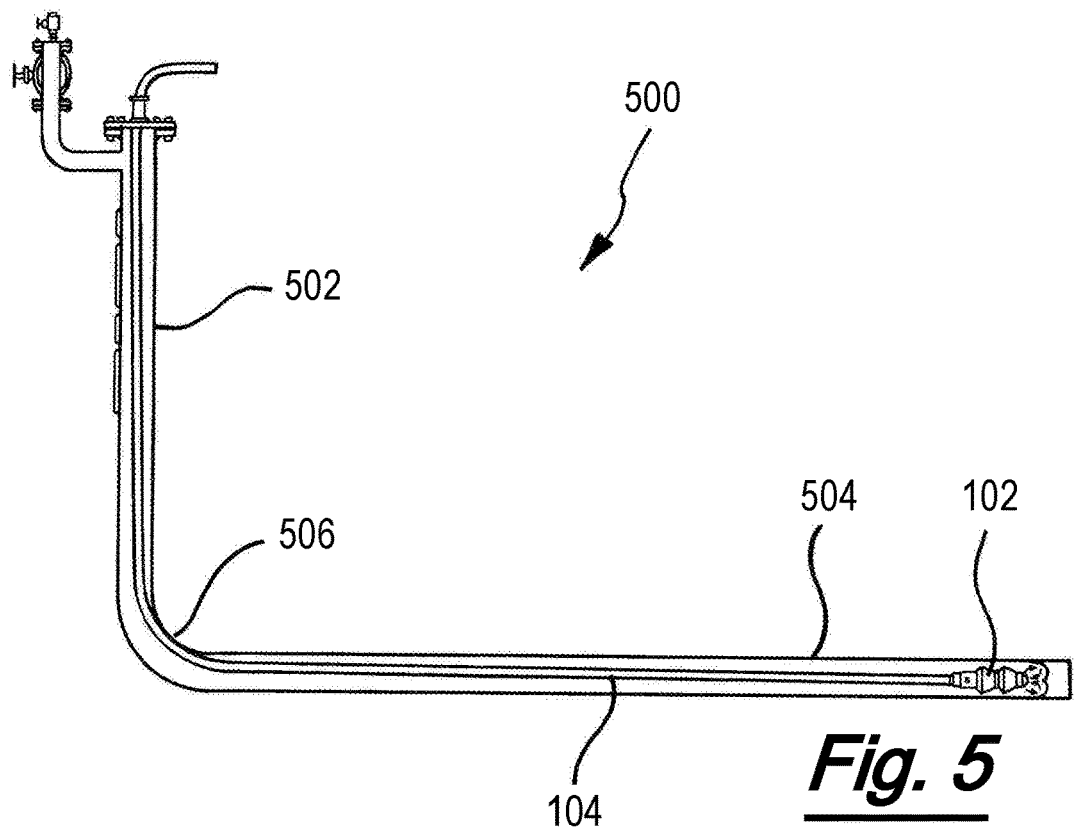
FIG. 5 schematic representation of a pipeline system and apparatus according to an embodiment of the invention.

FIG. 5 illustrates schematically a pipeline system 500, with an apparatus 100 having been deployed from surface down a riser 502 to a subsea pipeline 504. In a method according to an embodiment of the invention, a heavy brine is circulated through the apparatus to fill the fluid conduit and the pipe 104. The brine is selected to reduce the effective weight of the pipe in the fluid conduit to below a weight threshold. In this case, the brine is a mixture of calcium chloride ($CaCl_2$) and calcium bromide ($CaBr_2$) brines selected to have a density of 1.55 kg/l (about 12.9 ppg), which is sufficient to render the pipe 104 neutrally buoyant, and lift the horizontal section of the pipe 104 from the subsea pipeline. This substantially eliminates friction effects between the pipe 104 and the subsea pipeline, and significantly reduces the friction between the pipe 104 and the inner surface of the fluid conduit between at the bend 506. The hanging weight of the vertical part of the pipe 104 is also substantially eliminated, and therefore the tension in the pipe beneath the pipework 200 is very small. This significantly reduces the effect of capstan friction in the convoluted pipework during retrieval of the apparatus.

It will be appreciated that other brines, of other densities, could be used to render the pipe positively buoyant, or to bring a negatively buoyant pipe towards a neutrally buoyant or positively buoyant condition (without necessarily reaching neutral or positive buoyancy).

The brine may for example be selected from a brine selected from the group comprising potassium chloride (KCl), sodium chloride (NaCl), potassium bromide (KBr), calcium chloride ($CaCl_2$), sodium bromide (NaBr), calcium bromide ($CaBr_2$), zinc bromide ($ZnBr_2$). Other brines, for example those marked by Halliburton Energy Services Inc. under the BRINEDRIL-N® brand may be used in alternative embodiments of the invention.

A brine of calcium chloride may be preferred as it is readily available and is known to have properties acceptable for use in hydrocarbon applications, although it is not suitable for completely floating the pipe in the foregoing example (resulting in a weight per unit length of 0.2 kg/l).

It will be appreciated that the heavy fluid may be circulated in the fluid conduit in a dedicated deployment or retrieval phase of the operation, and in different phases, alternative (lighter) fluids may be circulated, including dedicated cleaning or treatment fluids.

In an alternative embodiment of the invention, the composite pipe of this embodiment is a glass fibre reinforced polymer pipe, for example of the type described in GB2337569, with an inner diameter of 50.8 mm. The pipe comprises an outer wall which is of unitary construction and forms the primary structure which supports the pipe against longitudinal tensile and radial compressive forces. The composite pipe is spoolable, and has a minimum bend radius of approximately 20 to 50 times the inner diameter of the pipe. The composite pipe has a weight per unit length in water of 2.0 kg/m and a tensile strength of around 9,500 kg. The composite pipe has a collapse pressure rating of around 2,200 psi, and a working pressure of around 3,500 psi. In this example, the brine density required to render the pipe neutrally buoyant is 3.47 kg/l or 29 ppg, which is very high and beyond the reach of most readily available brines. Therefore in this embodiment, a brine of lower density, such as calcium bromide, is used to reduce the weight of the pipe in the fluid conduit and reduce the force required to pull the pipe from the fluid conduit (thereby having a positive effect on capstan friction).

In addition, in order to further reduce the effect of friction, a method of this embodiment of the invention comprises generating a pressure pulse in the pipe to create a fluid-surface interaction which temporarily reduces the coefficient of friction between the pipe and the fluid conduit at all contact points along its length.

The apparatus 100 includes control module 120 with a pump and a controllable valve, which enables the pipe and/or the annulus to be exposed to a pressure differential, when the valve is opened. In this embodiment, the valve is controllably opened to generate a series of positive pressure pulses, having a magnitude greater than 200 psi (over a base pressure of around 2,000 psi), a duration of 0.5 seconds and a frequency of 1 Hz. The propagation of the positive pressure pulse in the pipe causes a fluid-surface interaction which temporarily reduces the frictional effect between the pipe and its contact points in the fluid conduit. While the pulses are being transmitted, a pulling force is applied to the pipe by the injection unit in order to retrieve the apparatus.

The invention provides a method and apparatus for cleaning a fluid conduit in a hydrocarbon production installation. The method comprises providing a composite pipe having a cleaning head coupled to a first end, and introducing the first end of the composite pipe and the cleaning head into a fluid conduit to be cleaned. Fluid is circulated between an annulus between an interior wall of the fluid conduit and the composite pipe, through a fluid circulation path defined by the cleaning head. The method comprises running the first end of the composite pipe and the cleaning head into the fluid conduit and cleaning at least one substance from the fluid conduit. An aspect of the invention relates to methods comprising circulating a heavy fluid through the fluid circulation path to reduce the effective weight of the pipe in the fluid conduit, and another aspect relates to a method comprising generating at least one pressure pulse in fluid in the fluid circulation path while imparting a pulling force or a pushing force on the pipe.

The invention facilitates application to a wide range of fluid conduit systems. The use of composite pipe in the first aspect of the invention offers advantages over steel coiled tubing wellbore cleaning systems and flexible hose cleaning systems of the prior art. The use of composite pipe facilitates application to a wide range of fluid conduit systems. The use of composite pipe reduces the force required to pull out and/or inject a cleaning apparatus from and/or into a fluid conduit; increases the depth to which a cleaning apparatus can be deployed into a fluid conduit; and reduces the damage to a fluid conduit during a deployment and/or pulling of a cleaning apparatus into and/or from a fluid conduit.

Various modifications to the above-described embodiments may be made within the scope of the invention, and the invention extends to combinations of features other than those expressly claimed herein.

The invention claimed is:

1. A method of cleaning a fluid conduit in a hydrocarbon production installation, the method comprising:
   providing an apparatus for cleaning a fluid conduit in a hydrocarbon production installation, the apparatus comprising:
   a composite pipe having a cleaning head coupled to a first end;
   a pressure control device, and
   an injector device for imparting a pushing and/or pulling force on the pipe;
   introducing the first end of the composite pipe and the cleaning head into the fluid conduit to be cleaned using the injector device for imparting the pushing and pulling force on the composite pipe;
   circulating fluid between an annulus between an interior wall of the fluid conduit and the composite pipe, and through a fluid circulation path defined by the cleaning head;
   running the first end of the composite pipe and the cleaning head into the fluid conduit;
   cleaning at least one substance from the fluid conduit;
   retrieving the composite pipe and the cleaning head using the injector device.

2. The method according to claim 1, wherein the composite pipe is a carbon fibre pipe or a carbon fibre polymer pipe.

3. The method according to claim 1, wherein the composite pipe comprises carbon fibre and a polymer in the polyaryletherketone (PAEK) family.

4. The method according to claim 1, wherein the composite pipe comprises an inner diameter in the range of 25 mm to 75 mm.

5. The method according to claim 1, wherein the composite pipe has a weight per unit length in water in the range of 0.25 kg/m to 2.5 kg/m.

6. The method according to claim 1, wherein the composite pipe has a tensile strength of greater than 2,000 kg.

7. The method according to claim 1, wherein the composite pipe has a collapse pressure rating in excess of 1,000 psi.

8. The method according to claim 1, wherein the composite pipe has a minimum elastic bending radius of less than 100 times the inner diameter of the pipe.

9. The method according to claim 1, wherein the composite pipe comprises a primary wall which is of unitary construction and provides axial tensile and radial compressive support to the composite pipe, and wherein the primary wall of the composite pipe is an outer wall of the composite pipe.

10. The method according to claim 1, comprising generating a thrust force on the cleaning head by circulating fluid through the circulation path.

11. The method according to claim 1, comprising circulating a heavy fluid through the fluid circulation path to reduce the effective weight of the pipe in the fluid conduit.

12. The method according to claim 11, wherein the heavy fluid is a brine.

13. The method according to claim 11, wherein the heavy fluid is a brine selected to reduce the effective weight of the pipe in the fluid conduit to below a weight threshold related to a maximum pulling and/or pushing force available to pull and/or push the pipe into the fluid conduit.

14. The method according to claim 11, wherein the heavy fluid has a density in the range of approximately 1.37 kg/l to 1.39 kg/l.

15. The method according to claim 11, wherein the heavy fluid has a density in the range of approximately 1.80 kg/I to 1.92 kg/I.

16. The method according to any claim 11, wherein the heavy fluid is selected to render the pipe neutrally or positively buoyant, or is selected to bring a negatively buoyant pipe towards a neutrally buoyant or positively buoyant condition.

17. The method according to claim 11, comprising exposing the pipe to the heavy fluid while imparting a pulling force or pushing force on the pipe.

18. The method according to claim 11, comprising circulating the heavy fluid in the fluid circulation path to fill the fluid conduit and/or pipe prior to imparting a pulling and/or a pushing force on the pipe.

19. The method according to claim 11, comprising circulating a cleaning fluid during a cleaning phase of the operation, and circulating the heavy fluid, which is different from the cleaning fluid, prior to, during, and/or subsequent to the cleaning phase.

20. The method according to claim 1, comprising generating at least one pressure pulse in fluid in the fluid circulation path while imparting a pulling force or a pushing force on the pipe.

21. The method according to claim 20, comprising generating a plurality of pressure pulses in a series of pressure pulses.

* * * * *